US005627450A

United States Patent [19]
Ryan et al.

[11] Patent Number: 5,627,450
[45] Date of Patent: May 6, 1997

[54] TILTABLE DOCKING BASE WITH A BATTERY CHARGER

[75] Inventors: Sean P. Ryan, The Woodlands; James J. Tumlinson, Tomball; Teodros Mesfin, Houston, all of Tex.

[73] Assignee: Compaq Computer Corporation, Houston, Tex.

[21] Appl. No.: 598,163

[22] Filed: Feb. 7, 1996

Related U.S. Application Data

[63] Continuation of Ser. No. 188,488, Jan. 28, 1994, abandoned.

[51] Int. Cl.⁶ .............................. H01M 10/44; H05K 7/00
[52] U.S. Cl. .................. 320/15; 320/2; 361/680; D13/108
[58] Field of Search ........................ 320/2, 15, 6; 361/686, 361/680; D13/108, 107

[56] References Cited

U.S. PATENT DOCUMENTS

| | | | |
|---|---|---|---|
| D. 279,475 | 7/1985 | Papajhohn | D14/106 |
| D. 294,356 | 2/1988 | Papajohn | D14/106 |
| D. 298,537 | 11/1988 | Walters, II et al. | D14/106 |
| D. 306,433 | 3/1990 | Mitchell | D14/106 |
| D. 312,450 | 11/1990 | Walters, II | D14/106 |
| D. 312,623 | 12/1990 | Carter et al. | D14/100 |
| D. 320,196 | 9/1991 | Carter et al. | D14/107 |
| D. 324,369 | 3/1992 | Bushman et al. | D13/107 |
| D. 335,490 | 5/1993 | Mesfin et al. | D14/107 |
| 3,742,832 | 7/1973 | Stoneham et al. | 95/11 R |
| 4,742,478 | 5/1988 | Nigro, Jr. et al. | 364/708 |
| 4,832,419 | 5/1989 | Mitchell et al. | 312/7.2 |
| 4,882,684 | 11/1989 | Ishigami et al. | 364/708 |
| 4,903,222 | 2/1990 | Carter et al. | 364/708 |
| 5,019,465 | 5/1991 | Herron et al. | 429/97 |
| 5,039,580 | 8/1991 | Mori et al. | 429/97 |
| 5,060,990 | 10/1991 | Smith et al. | 292/91 |
| 5,136,231 | 8/1992 | Faulk | 320/31 |
| 5,162,719 | 11/1992 | Tomura et al. | 320/2 |
| 5,182,698 | 1/1993 | Kobayashi et al. | 361/395 |
| 5,189,358 | 2/1993 | Tomura et al. | 320/2 |
| 5,199,888 | 4/1993 | Condra et al. | 439/142 |
| 5,208,736 | 5/1993 | Crooks et al. | 361/393 |
| 5,225,293 | 7/1993 | Mitchell et al. | 429/97 |
| 5,256,955 | 10/1993 | Tomura et al. | 320/2 |
| 5,280,229 | 1/1994 | Faude et al. | 320/2 |
| 5,420,493 | 5/1995 | Hargadon et al. | 320/15 |

FOREIGN PATENT DOCUMENTS

| | | | |
|---|---|---|---|
| 5-250067 | 9/1993 | Japan . | |
| WO91/04461 | 4/1991 | WIPO | G01D 15/00 |

OTHER PUBLICATIONS

U.S. application No. 07/701,657, Dehnel, filed May 16, 1991.
U.S. application No. 08/033,821, Lin et al., filed Mar. 19,1993.
U.S. application No. 08/033,869, Perkins et al., filed Mar. 19, 1993.
U.S. application No. 08/119,426, Illingworth et al., filed Sep. 10, 1993.
U.S. application No. 08/119,865, Goodrich et al., filed Sep. 10, 1993.
U.S. application No. 07/774,113, Kreiner, filed Oct. 07,1991.
U.S. application No. 29/016,944, Youens, filed Dec. 30, 1993.
U.S. application No. 29/016,931, Youens et al., filed Dec. 30, 1993.

(List continued on next page.)

*Primary Examiner*—Robert Nappi
*Attorney, Agent, or Firm*—Pravel, Hewitt, Kimball & Krieger

[57] ABSTRACT

A docking base including an integral charger holder sized for receiving a notebook computer rechargeable battery is disclosed. The battery when positioned in the holder is electrically coupled to a power source for recharging the battery. The base further includes movable legs so that the keyboard of the notebook computer, when positioned on the base, can be either positioned horizontally or inclined as ergonomically desired by the individual users.

22 Claims, 2 Drawing Sheets

OTHER PUBLICATIONS

U.S. application No. 29/016,931, Youens et al., filed Dec. 30, 1993.

U.S. application No. 29/016,936, Youens, filed Dec. 30, 1993.

U.S. application No. 29/016,940, Michael, filed Dec. 30, 1993.

U.S. application No. 29/017,148, Leman V., filed Dec. 30, 1993.

U.S. application No. 29/018,099, Ryan et al., filed Jan. 27, 1994.

396SX Notebook PC System; ©1991 Wang Laboratories (Taiwan) Ltd.; Printed in Taiwan Aug. 1991; Revised Apr. 15, 1992; 2 pages total.

AT&T Safari NSX/20 User's Guide, 562-200-143 Issue 1, ©1991 AT&T; System Description (Rear Panel Connections) pp. 1–4 of User's Guide; 3 pages total.

IBM Personal System/2 Model L40 SX Quick Reference, First Edition (Feb. 1991) © Copyright International Business Machines Corporation 1991; Setting Up Your Computer; Getting Started; p. 6 of brochure; 3 pages total.

Zenith data systems, MastersPort 386 SL Owner's Manual 595–4912; Copyright 1991 by Zenith Data Systems Corporation; Printed in United States of America; External Floppy Disk Drive and External Video Monitor, pp. 3–10 of Owner's Manual; 3 pages total.

Everex Tempo Carrier Owner's Manual; ©Everex Systems, Inc., 1991, Nov. 1991 Edition; The Back of the Tempo Carrier, p. 10; 3 pages total.

AST Premium® Exec User's Manual, Notebook–Sized AT–Compativle Computer, Third Edition (Aug. 1991), Copyright 1991 AST Research, Inc.; Figure 3–3, Opening the Battery Compartment; Figure 3–4. Connecting the AC Adapter; 4 pages total.

Dell System® 325NC User's Guide, © 1989–1992 Dell Computer Corporation; Printed in the United States of America, Jan. 1992; Using Your Computer, pp. 2–7; 3 pages total.

Toshiba T3300SL Notebook Computer Reference Manual, C148–1291M1; ©1992 by Toshiba Corporation; 3 pages total.

Momenta User's Reference Manual; copyright 1991 by Momenta Corporation, pages from "Connecting the Keyboard and the Stylus 1.2"; Setting Up the Screen 1.4; Chapter 1: Setup 1.11, (6 pages total).

"Battery Fastcharger/Discharger" brochure; ©1992 Compaq Computer Corporation (2 pages total).

©1989 Intelligence Technology Corporation Introducing to World's first cellular computer Now cellular communication is more than just talk (1 page advertisement).

Press Kit published by Intelligence Technology Corporation (21 pages) Note: ITC 286 CAT indicated as patented on page 16.

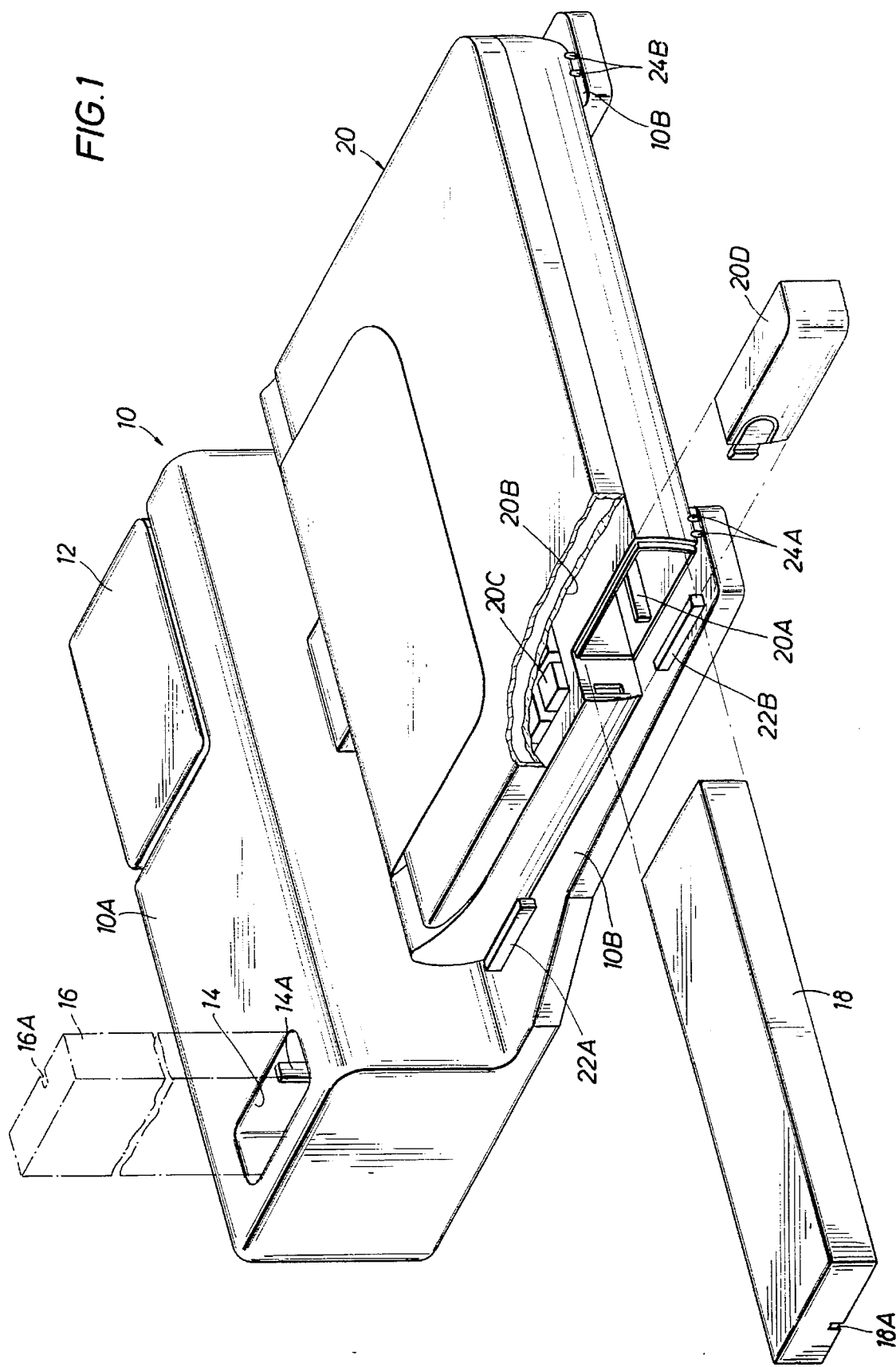

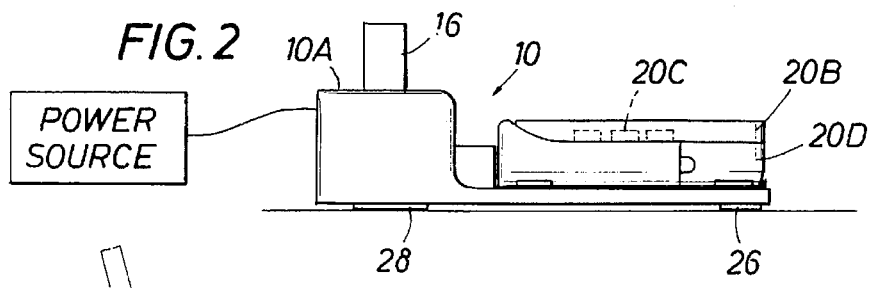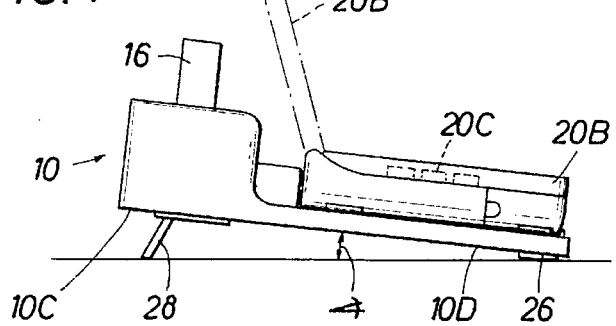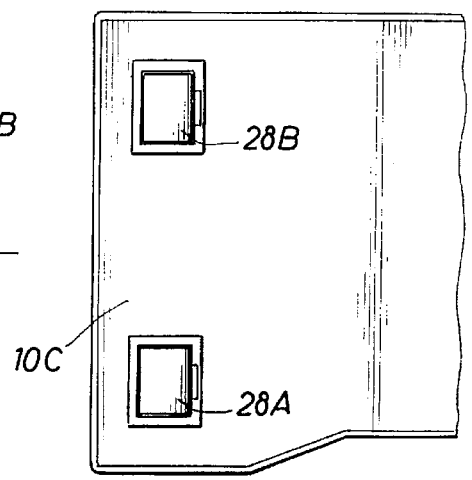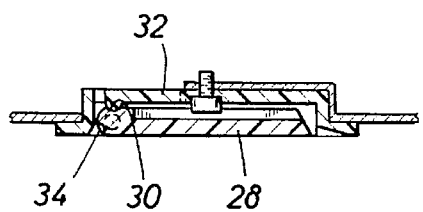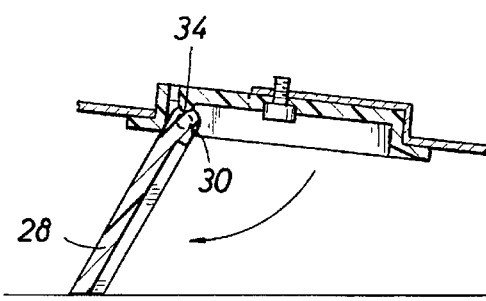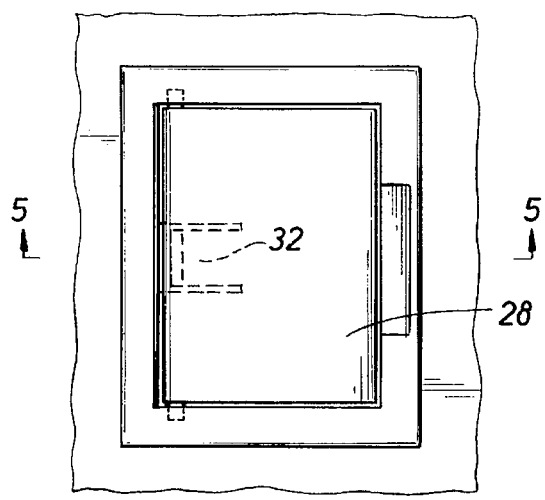

5,627,450

TILTABLE DOCKING BASE WITH A BATTERY CHARGER

This is a continuation of application Ser. No. 08/188,488 filed on Jan. 28, 1994, now abandoned.

BACKGROUND OF THE INVENTION

1. Field of the Invention

This invention relates to computers, more particularly, to a docking base for a notebook computer.

2. Background of the Invention

Docking bases have been used in the past for receiving notebook computers, such as shown in U.S. Pat. Nos. 4,903,222 and 5,199,888, assigned to the assignee of the present invention. Also, "stand alone" battery chargers that are separate from the base have been known for charging batteries sized to be used with the notebook computer, such as shown in Compaq Corporation publication entitled "Compaq Contura Family—Battery Fastcharger/ Discharger"© 1992 Compaq Computer Corporation.

Docking base is a general term used to describe both an expansion base and a convenience base. An expansion base, such as shown in U.S. Pat. No. 5,199,888, is distinguished from a convenience base in that the convenience base is merely a docking station for the notebook computer without capabilities to receive floppy disks, cards and drives.

Notebook computers that are sized to be received in these docking stations are generally configured so that when the notebook computer is placed on a horizontal surface the keyboard is horizontal, such as shown in FIG. 2 of U.S. Pat. No. 5,208,736, assigned to the assignee of the present invention. Some laptop computers have included movable legs to tilt the keyboard at a more ergonomic position, such as shown in U.S. Pat. Nos. 4,742,478 (FIG. 5) and 5,019,465 (FIG. 29).

It has also been known to tilt or incline keyboards using legs, such as shown in above U.S. Pat. No. 5,208,736 (FIGS. 9 and 10) and Ser. No. 08/119,865 (FIGS. 7, 15 and 17) entitled "Combined Notepad and Notebook Computer", assigned to the assignee of the present invention. Also, it has been known to use a separate external AC power supply box, such a shown in above U.S. Pat. No. 4,903,222.

Additionally, docking bases for portable computers have been built with an integral wedge so that when the portable computer is placed on the base the keyboard is inclined.

For some users an improperly positioned keyboard could aggravate repetitive stress injuries. One such stress injury is carpal tunnel syndrome where the victims of the disease feel pain and numbness in their wrists and hands from working long hours on a keyboard.

Therefore, it would be desirable to have a tiltable docking base to incline the keyboard of the computer if desired. Such a docking base would be movable to an inclined position or to a flat position so that one product could be sold to satisfy both needs thereby reducing manufacturing and inventory cost. It would also be desirable to have a docking base that could receive a rechargeable battery for charging. If desired, the user can then recharge one battery in the notebook computer and a second or backup battery in the housing.

In summary, a single docking base that can be positioned either in a flat or inclined position that provides the user with a charger integral with the docking base would save both money and space. Additionally, removably positioning of an AC power supply box with the docking base will save desk space for the user.

SUMMARY OF THE INVENTION

A docking base includes a charger holder sized for receiving a rechargeable battery that can be used with the notebook computer received on the base. The battery when positioned in the holder is electrically coupled to a power source for recharging the battery. The base further includes movable legs so that the keyboard of the notebook computer, when positioned on the base, can be either positioned horizontally or inclined.

BRIEF DESCRIPTION OF THE DRAWINGS

The objects, advantages and features of the invention will become more apparent by reference to the drawings which are appended hereto, wherein like numerals indicate like parts and wherein an illustrated embodiment of the invention is shown, of which:

FIG. 1 is a perspective view of the docking base of the present invention receiving a notebook computer with the screen portion of the notebook computer partially cut away to better illustrate the keyboard and the battery cover. The battery and battery cover of the notebook computer are shown exploded. Additionally, a second or backup rechargeable battery is shown in phantom view positioned in the base housing to better show the guide member of the holder;

FIG. 2 is a side elevational view of the base with a notebook computer shown in the flat position and a schematic of the power source;

FIG. 3 is a bottom partial view of the base of FIG. 2;

FIG. 4 is a side elevational view similar to FIG. 2 with the legs of the base shown in the extended tilt position for inclining the keyboard of the notebook computer. The screen of the notebook computer is shown in the operational position in phantom view and in the down position in solid lines;

FIG. 5 is a detailed sectional view taken along line 5—5 of FIG. 6 of a typical movable leg of the present invention in the flat position;

FIG. 6 is a detailed bottom view of FIG. 5; and

FIG. 7 is a detailed view of a typical leg in the extended tilt position.

DESCRIPTION OF THE PREFERRED EMBODIMENT

FIGS. 1–7 show the docking base, generally indicated at 10, of the present invention. The docking base includes a top rear portion 10A and a top front portion 10B, as best shown in FIG. 1, and a bottom rear portion 10C and a bottom front portion 10D, as best shown in FIGS. 3 and 4.

The top rear portion 10A of the docking base includes on its right side, as shown in FIG. 1, an AC power supply box 12 which is removably cradled with the base housing. Though not shown, the cradle includes an upstanding continuous shoulder along the rear of the base housing. The AC power supply box is, in turn, connected to a power source (e.g. an electrical wall outlet). On the left hand side of the top rear portion 10A of the base housing is an upwardly facing opening 14 that is sized to receive a battery 16. The battery, when inserted into the opening 14, will preferably extend upwardly and out of the opening 14 so that it will be conspicuous to the user of the docking base 10. In this position the battery will be pulled down by gravity to assure adequate electrical contact of the battery and the power source. Therefore, the electrical connectors of the inserted end of the battery will connect with the power supply box 12 for recharging the battery.

Though the present invention could be used with only one battery, preferably the invention will be used with two batteries—a battery in the notebook computer 18 and a second or backup battery 16. The second battery 16 is preferably identical to the first battery 18 that is received in the notebook computer, generally indicated at 20. The backup battery 16 includes an elongated slot 16A that is received on base housing guide member 14A to assist in proper positioning and alignment of the electrical connectors of the battery with the charger connectors. The notebook computer 20 similarly has a guide member 20A which is aligned with the battery slot 18A for properly positioning the electrical connectors of the battery with the internal notebook computer connectors. The docking base includes a number of track members 22A, 22B on one side and similar track members on the opposing side for properly positioning the notebook computer 20 on the base 10. Similarly, nubs 24A, 24B are found on the top front portion 10B of the base 10 to prevent forward movement of the notebook computer and for proper positioning of the notebook computer 20. Movement of the rear portion of the notebook computer is controlled by connection of the base connector with the rear notebook computer connector, as will be described below.

The notebook computer further includes a screen 20B and a keyboard 20C. As best seen in FIGS. 1 and 2, the conventional keyboard is generally parallel with the bottom of the base 10 when placed on the front top portion of the base 10. The inclination of the keyboard when in use will depend in part on the supporting surface, such as a table or desk, which normally are horizontal. As best seen in FIG. 1, the battery cover 20D can be unlatched to permit sliding withdraw of the battery 18 from the notebook computer 20.

The docking base includes two front feet 26 (only one foot shown) located generally in the front bottom base corners. Preferably, these feet are made from a soft rubber to provide sufficient friction with the supporting surface and to absorb some vibration. These soft feet will also desirably deform when the base is in either the flat position (FIG. 2) or the tilt position (FIG. 4). As best shown in FIGS. 4 and 7, when the base 10 is in the tilt position, the legs 28A, 28B are pivoted downwardly. Upon extending the legs 28, the indentation 30 in the hinged portion of the leg 28 disengages from the nub on the movable member 32 (FIG. 5) and is rotated until the indentation 34 is received in the nub on the member 32 (FIG. 7). When the legs 28 are put in the extended tilt position, the bottom of the base is tilted, preferably between 5° and 6°, as best shown in FIG. 4. Preferably, tilt of the bottom of the base and, therefore, the keycaps of the keyboard 20° C. are at a 5½° incline.

When the notebook computer is received on the base 10, the rear notebook computer connector is electrically coupled with the base connector, such as described in U.S. Pat. No. 5,199,888, which is incorporated herein for all purposes.

The docking base described, or in particular, the convenience base as shown in FIG. 1, saves desk or table and inventory space and money by integrally incorporating a battery charger within the base housing along with the AC power supply box 12. Furthermore, this base preferably includes two movable legs that allow the base to be used either in the flat position, as shown in FIG. 2, or in the tilt position, as shown in FIG. 4, so that the keyboard can be positioned at the individual user's desired ergonomic position. Though the battery charger is integral with the docking base, conventional electronics for charging may be used for charging the battery, such as disclosed on U.S. Pat. No. 5,136,231, which is assigned to the assignee of the present invention and is incorporated herein for all purposes.

It is to be understood that this invention could be used with an appropriate expansion base or a convenience base as shown.

The foregoing disclosure and description of the invention are illustrative and explanatory thereof, and various changes in the size, shape and materials, as well as the details of the illustrated construction may be made without departing from the spirit of the invention.

We claim:

1. A docking base for use with a notebook computer having a connector, the base being connectable to a power source, the base comprising:

a first rechargeable battery and a second rechargeable battery, said batteries sized for use with and for providing power to the notebook computer, an integral base housing having a front section for receiving the notebook computer and a rear section having a holder independent of said notebook computer, said front section and said rear section of said docking base housing providing a shoulder in said docking base housing, said holder sized for receiving one of said rechargeable batteries, said holder electrically coupled to the power source for charging one of said rechargeable batteries, and a connector disposed in said docking base housing shoulder for disengageable connection with said notebook computer connector to limit movement of the notebook computer relative to the shoulder.

2. The base of claim 1 wherein said second battery is identical in configuration to said first battery.

3. The base of claim 2 wherein said first battery is rechargeable while in said notebook computer and said second battery is rechargeable in said holder.

4. The base of claim 4 wherein said holder is an opening in said base housing sized to receive said second battery.

5. The base of claim 4 wherein said opening is upwardly facing in said housing so that said second battery is pulled downwardly by gravity.

6. The base of claim 2 wherein said base holder and said notebook computer each have a guide member for positioning of the first and second batteries.

7. The base of claim 1 further comprising a power supply box removably positioned with said base housing.

8. Apparatus adapted for use with a notebook computer having a front end and a rear end, a keyboard, a connector, and a screen, said connector provided in said computer rear end, comprising a docking base housing having a top, bottom, front portion, a front end and rear portion, said top front portion of said docking base housing and said top rear portion of said docking base housing providing a shoulder in said docking base housing, a connector disposed in said docking base housing shoulder for disengageable connection with the notebook computer connector to limit movement of the rear end of the notebook computer relative to the docking base housing shoulder, and, movable tilt member disposed on the bottom of said base housing to raise the bottom rear portion of said base housing relative to said bottom front portion of said base housing.

9. Apparatus of claim 8 wherein said tilt member comprises at least one movable leg.

10. Apparatus of claim 8 wherein said top front end of said docking base housing includes a nub to prevent forward movement of the front end of said notebook computer.

11. Apparatus of claim 8 wherein said tilt member is movable relative to the bottom of said base housing between a flat position and an extended tilt position for inclining the base housing.

12. Apparatus of claim 9 wherein, when said notebook computer is received on said base housing, said keyboard is inclined downwardly from the rear portion of said base housing to the front portion of said base housing when the leg is in the extended tilt position.

13. Apparatus of claim 11 further comprising a supporting surface wherein when said tilt member is in the flat position and said base housing is disposed on said surface, said bottom of said base housing is parallel to the surface onto which said base housing is disposed.

14. Apparatus of claim 12 wherein in the extended tilt position the keyboard is inclined 5° to 6°.

15. Apparatus of claim 12 wherein in the extended tilt position the keyboard is inclined approximately 5½°.

16. Apparatus connected to a power source and adapted for use with a notebook computer having a connector keyboard and a screen, comprising:

a docking base housing having a top, bottom, front portion and rear portion, said front portion and said rear portion of said docking base housing providing a shoulder in said docking base housing, a first rechargeable battery sized for use with and for providing power to the notebook computer, a holder disposed in said top rear portion of said base housing and electrically coupled to the power source through said base housing for charging said first rechargeable battery, movable tilt member disposed on bottom rear portion of said base housing to raise the rear portion of said base housing relative to said front portion of said base housing, and a connector disposed in said docking base housing shoulder for disengageable connection with said notebook computer connector to limit movement of the notebook computer relative to the shoulder.

17. Apparatus of claim 16 wherein said tilt member comprises a pair of legs, said legs are movable relative to the bottom of said base housing between a flat position and an extended tilt position for inclining the base.

18. Apparatus of claim 16 wherein said holder is an upwardly facing opening in said housing sized to receive said battery so that said battery is pulled downwardly by gravity.

19. Apparatus of claim 17 wherein when the base housing is in the extended tilt position of the keyboard is inclined between 5° to 6°.

20. Apparatus adapted for use with a notebook computer having a connector, keyboard and a screen, comprising a docking base housing having a top, bottom, front portion and rear portion, the top of said base housing sized to removably receive the notebook computer, said front portion and said rear portion of said docking base housing providing a shoulder in said docking base housing, a connector disposed in said docking base housing shoulder for disengageable connection with said notebook computer connector to limit movement of the notebook computer relative to the shoulder, and movable tilt member disposed on the bottom of said base housing to raise the bottom rear portion of said base housing relative to said bottom front portion of said base housing wherein said tilt member is movable relative to the bottom of said base housing between a flat position and an extended tilt position for inclining the base housing.

21. Apparatus of claim 20 further comprising a supporting surface wherein when said tilt member is in the flat position and said base housing is disposed on said surface, said bottom of said base housing is substantially parallel to the surface onto which said base housing is disposed.

22. Apparatus of claim 20 further comprising a supporting surface wherein when said tilt member is in the flat position and said base housing is disposed on said surface, said top front portion of said base housing is substantially parallel to the surface onto which said base housing is disposed.

\* \* \* \* \*